Dec. 21, 1965  C. B. McELHENY ET AL  3,224,284
TRANSMISSION
Filed April 5, 1962  7 Sheets-Sheet 2
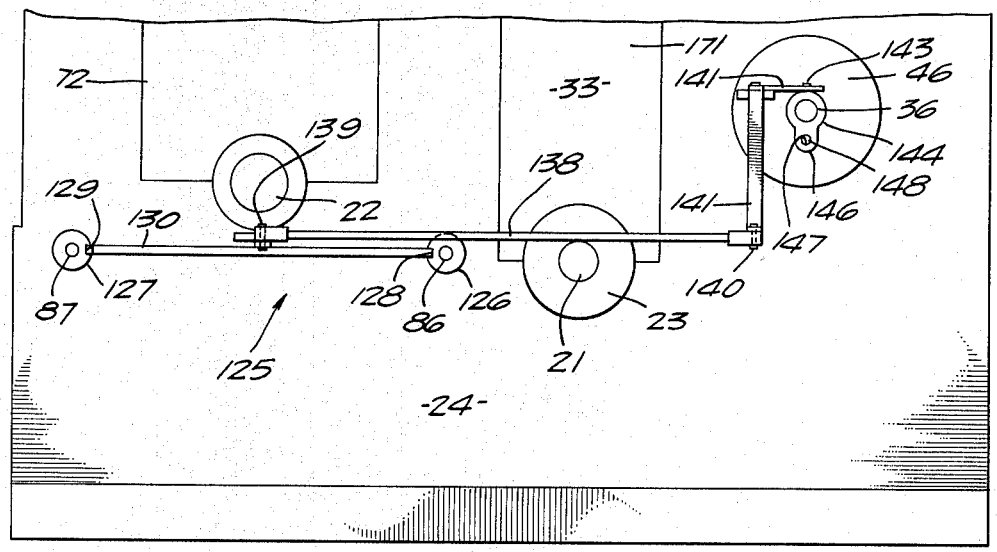
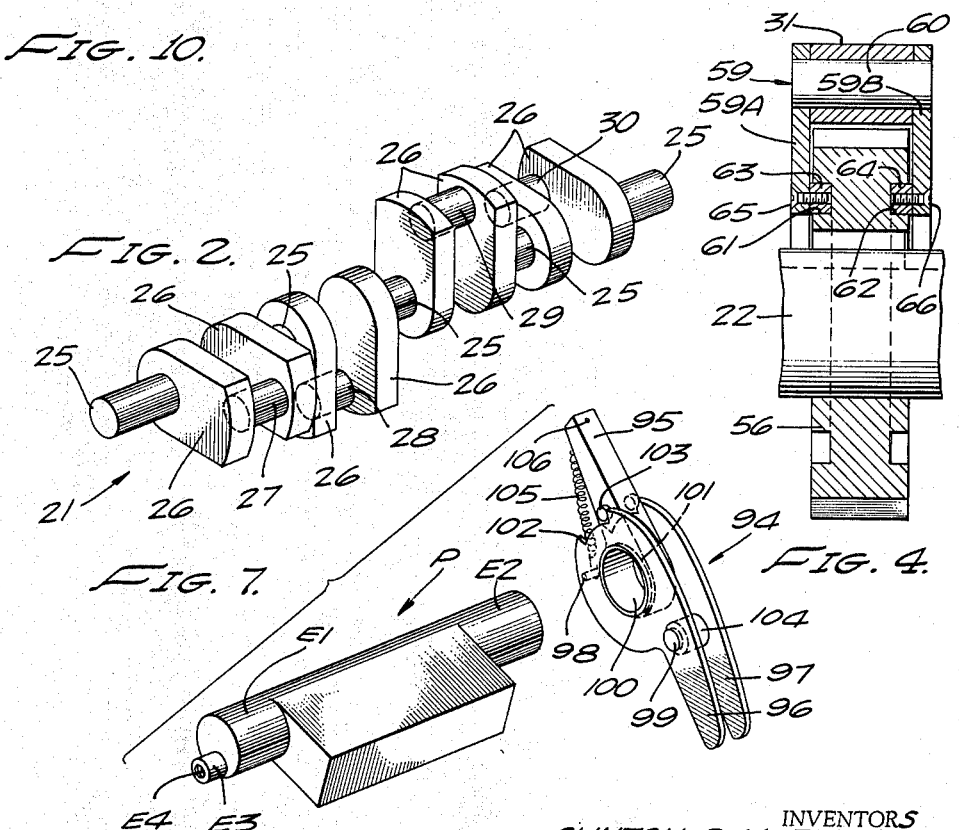
INVENTORS
CLINTON B. McELHENY
MYRL M. SAUERS
BY
KENDRICK, SCHRAMM & STOLZY
ATTORNEYS

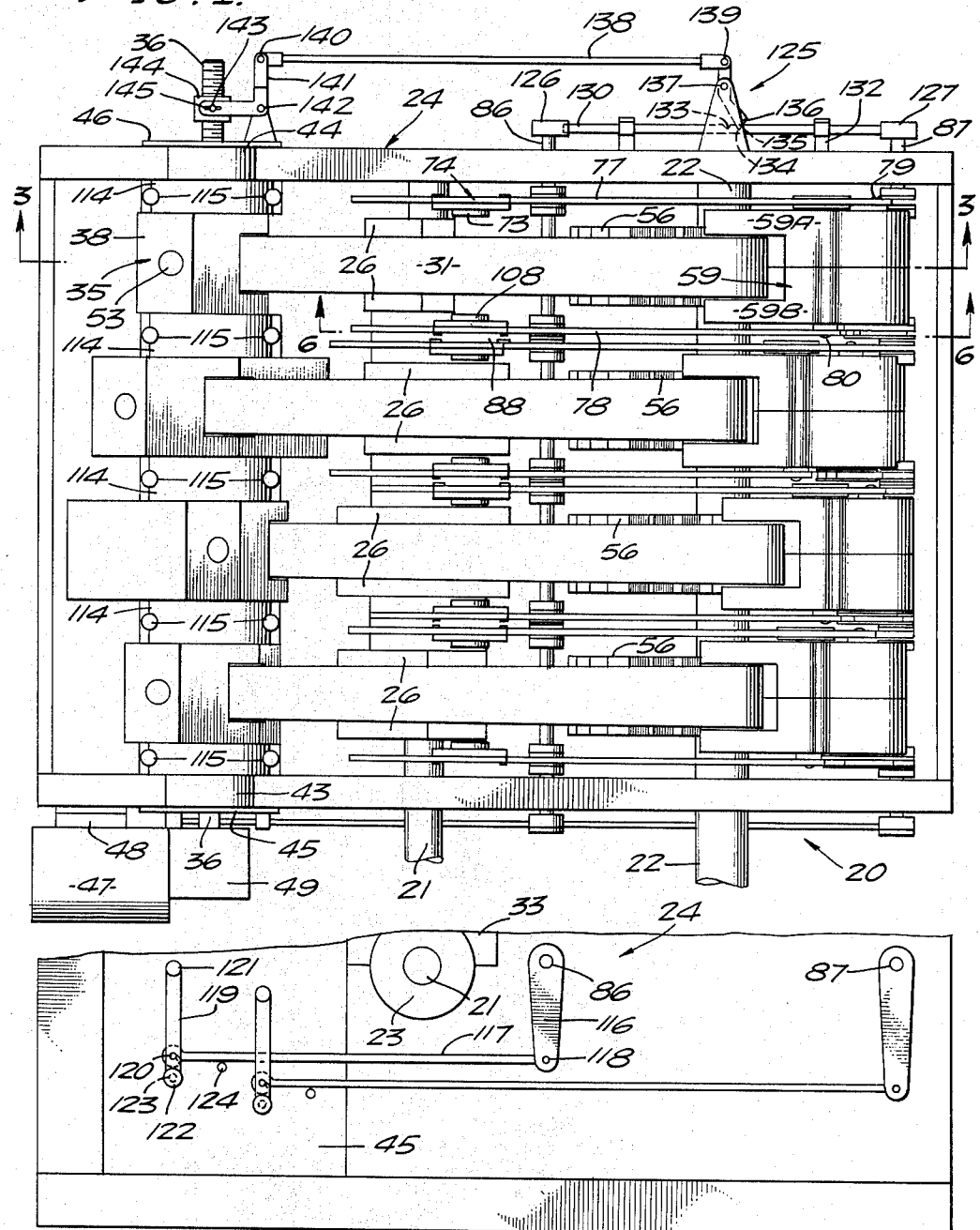

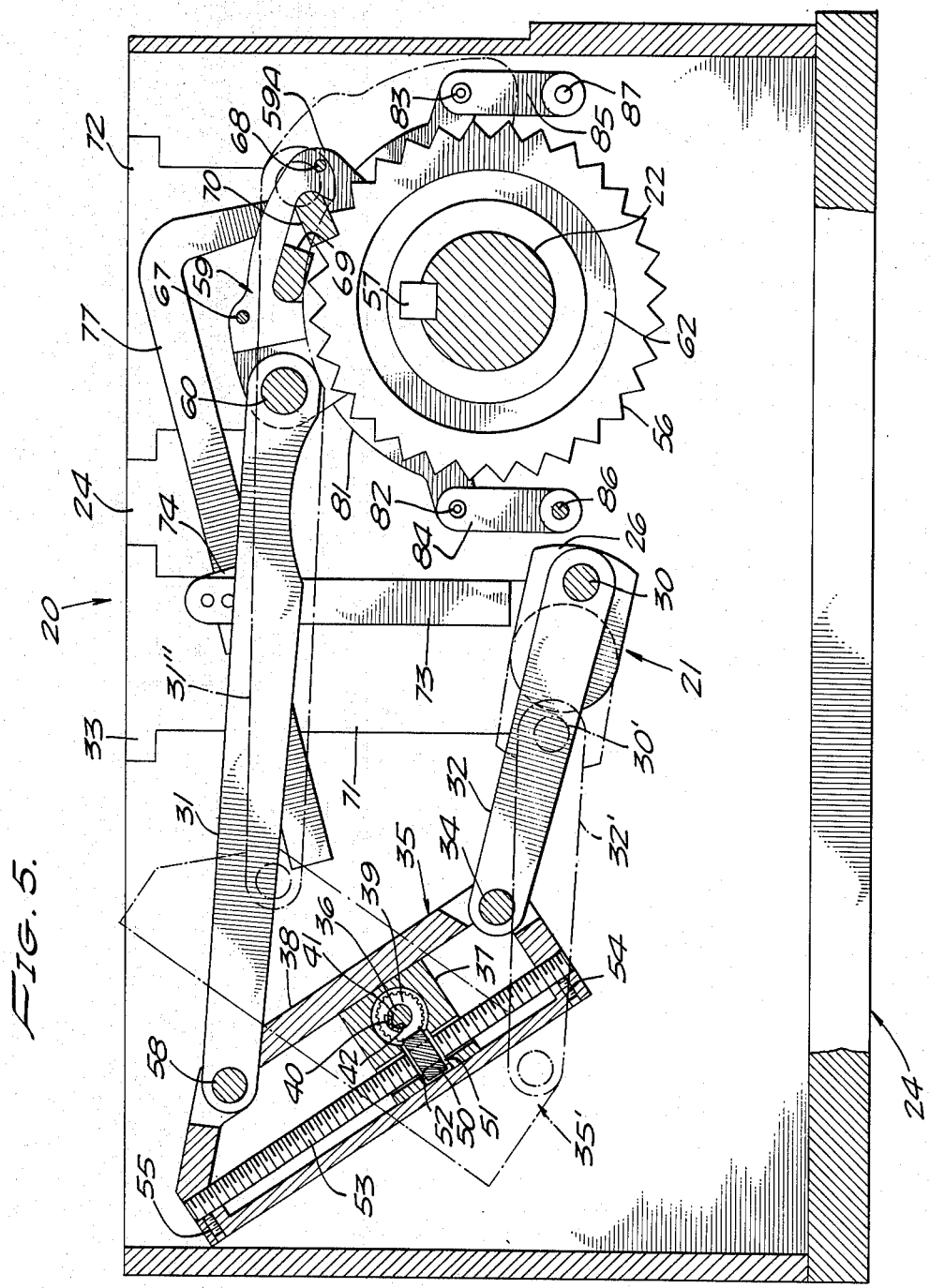

INVENTORS
CLINTON B. McELHENY
MYRL M. SAUERS
BY
KENDRICK, SCHRAMM & STOLZY
ATTORNEYS

Dec. 21, 1965   C. B. McELHENY ET AL   3,224,284
TRANSMISSION
Filed April 5, 1962   7 Sheets-Sheet 6

INVENTORS
CLINTON B. McELHENY
MYRL M. SAUERS
BY
KENDRICK, SCHRAMM & STOLZY
ATTORNEYS

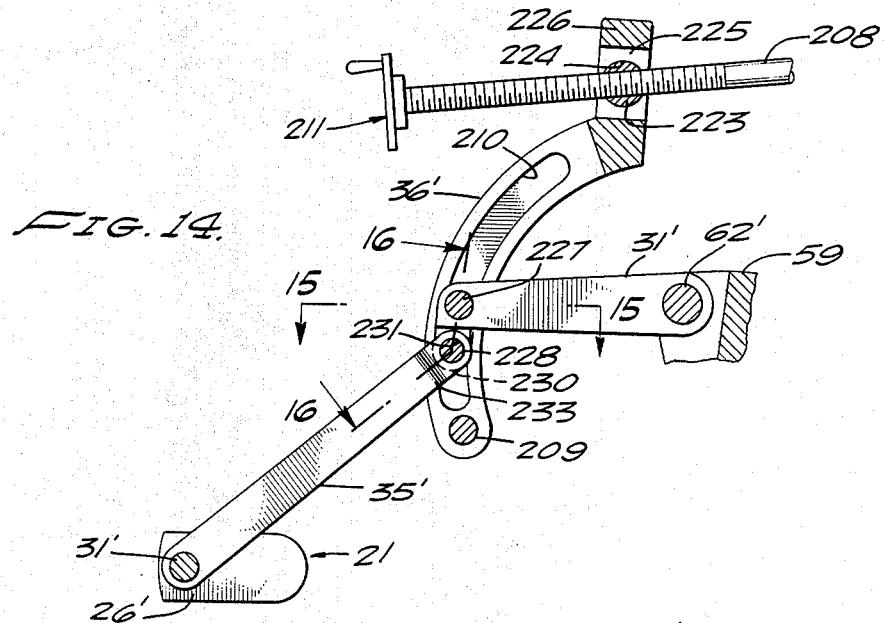
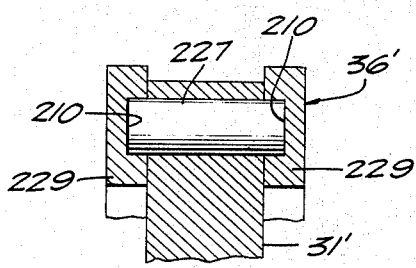
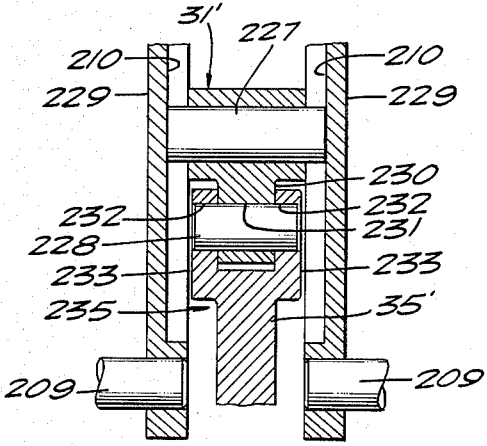
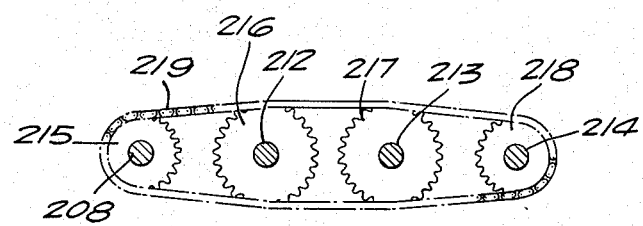

United States Patent Office 3,224,284
Patented Dec. 21, 1965

3,224,284
TRANSMISSION
Clinton B. McElheny, 1680 Tartar Lane, and Myrl M. Sauers, Space 1, 1680 Tartar Lane, both of Compton, Calif.
Filed Apr. 5, 1962, Ser. No. 185,339
5 Claims. (Cl. 74—119)

This invention relates to mechanical power conversion devices and more particularly to a smoothly operating system of employing power supplied by a reciprocatory driving linkage to rotate a rotary output shaft.

The device of the present invention will, of course, have many applications other than those mentioned herein and, thus, should not be limited to the uses specifically set forth in this disclosure. However, the present invention and all the features thereof have been found to have substantial utility when employed in a transmission for use with a constant speed prime mover. Thus the invention may find application for use with motors on boats, tractors, hoists, trucks, and conveyor equipment.

Prime movers of substantially constant running speeds are, of course, well known in the art. One of these types of prime movers which is finding more and more acceptance as time goes on is that of the gas turbine which may be operated and maintained inexpensively. Unfortunately, the lack of an acceptable variable speed transmission has severely limited the uses to which a gas turbine may be put. In particular, overriding clutches which become damaged and jam have been employed in variable speed transmissions of the prior art. Still further, such transmissions have also employed eccentric drives which are far from being maintenance free.

The device of the present invention overcomes the above-described and other disadvantages of the prior art by providing a variable speed transmission including an input crankshaft, an adjustable linkage pivoted relative to the crankshaft, and a pawl operated output ratchet wheel, the linkage being connected to the pawl to oscillate the pawl over a distance variable with adjustment of the position of the linkage. Thus by using a freely operated pawl the propensity of overriding clutches to become damaged and to jam is avoided. Still further, the costly maintenance of an eccentric drive may be avoided in accordance with the present invention by employing the combination of the input crankshaft with a pivoted linkage. A linkage shaft may also be provided, on which the linkage is pivotally mounted. Output means are then provided responsive to movement of the linkage by rotation of the crankshaft for continually applying torque to rotate an output shaft a predetermined amount periodically. Speed control means may also be provided to adjust the position of the linkage, the output means travel of the predetermined amount thus being variable with the adjustment of the linkage shaft.

According to a feature of the present invention, the linkage shaft is employed to adjust the position of the linkage. Thus, no substantial additional component parts are required and such an adjustment may be made easily. A maintenance-free variable speed transmission may thus be provided.

In accordance with an outstanding feature of the invention, a plurality of connecting rods rather than a single connecting rod are pivoted from the crankshaft and a linkage, output means and speed control means are provided for each one of the connecting rods. By using a plurality of sets of driving mechanisms, it is thus possible to overlap the period of engagement of the reciprocatory motion of each of the linkages to provide a vibration free variable speed transmission. Along these same lines, it is also a feature of the invention that an even number of such sets of driving mechanisms are employed in a driving system including a ratchet wheel having a corresponding number of axially spaced sets of teeth with the teeth in one-half of the sets being angularly spaced around the wheel a distance equal to one-half tooth from the other half or the other sets of teeth.

Another outstanding feature of the present invention includes a vibration-free damping pawl actuator. This actuator may be employed with cams to operate a plurality of pawls in a system where it is desirable to have periods of overlapping engagement of at least one pair of pawls to improve the vibration-free character of the pawl actuator and the operation of the pawls.

Another feature of the present invention resides in a special orientation between input and output shafts and any linkages connected thereto to reduce vibration.

Still another feature of the present invention resides in the use of a reversing mechanism for use with cam operated pawls of the type described above. Still further, in the use of this reversing mechanism, special yielding means are provided between pawl and pawl actuator to prevent removal of a pawl from a ratchet wheel while the ratchet wheel is under a load tending to keep the pawl in engagement therewith.

In accordance with another feature of the present invention, means are provided to prevent reversing the operation of the variable speed transmission of the present invention when the same is not in neutral. Conversely, and in order to further prevent jamming of the equipment, means are also provided to prevent the operation of the said reversing means when the speed control means are in a position such that the output shaft of the transmission is being driven at zero velocity.

In accordance with another embodiment of the present invention movably adjustable means for guiding movement of a connecting arm are provided. The connecting arm may move along an arc of a circle. The connecting arm from the pivot positions at the ends thereof on the guide means and on pawl support means or the like may then be equal to the radius of the said circle. A perfect neutral may thus be reached by a suitable adjustment of the guide means.

The above described and other advantages of the present invention will be better understood from the following description when considered in connection with the accompanying drawings.

In the drawings, which are to be regarded as merely illustrative:

FIG. 1 is a top plan view of a variable speed transmission made in accordance with the present invention;

FIG. 2 is a perspective view of a crankshaft which may be employed with the transmission shown in FIG. 1;

FIG. 4 is a sectional view taken on the line 4—4 of the transmission shown in FIG. 3;

FIG. 5 is a sectional view of the transmission illustrating movements in the operation thereof, the section being similar to that shown in FIG. 3;

FIG. 7 is an exploded perspective view of a pawl operator and pawl assembly which may be employed in accordance with the present invention;

FIG. 9 is a broken away front elevational view of the transmission shown in FIG. 1;

FIG. 10 is a broken away rear elevational view of the transmission shown in FIG. 1;

FIG. 14 is a sectional view taken on the line 14—14 of the embodiment of the invention shown in FIG. 13;

FIG. 15 is a sectional view taken on the line 15—15 of the device shown in FIG. 14;

FIG. 16 is a sectional view taken on the line 16—16 of the device shown in FIG. 14; and FIG. 17 is a sectional view of a variable speed transmission taken on the line 17—17 shown in FIG. 13.

Figure 3:
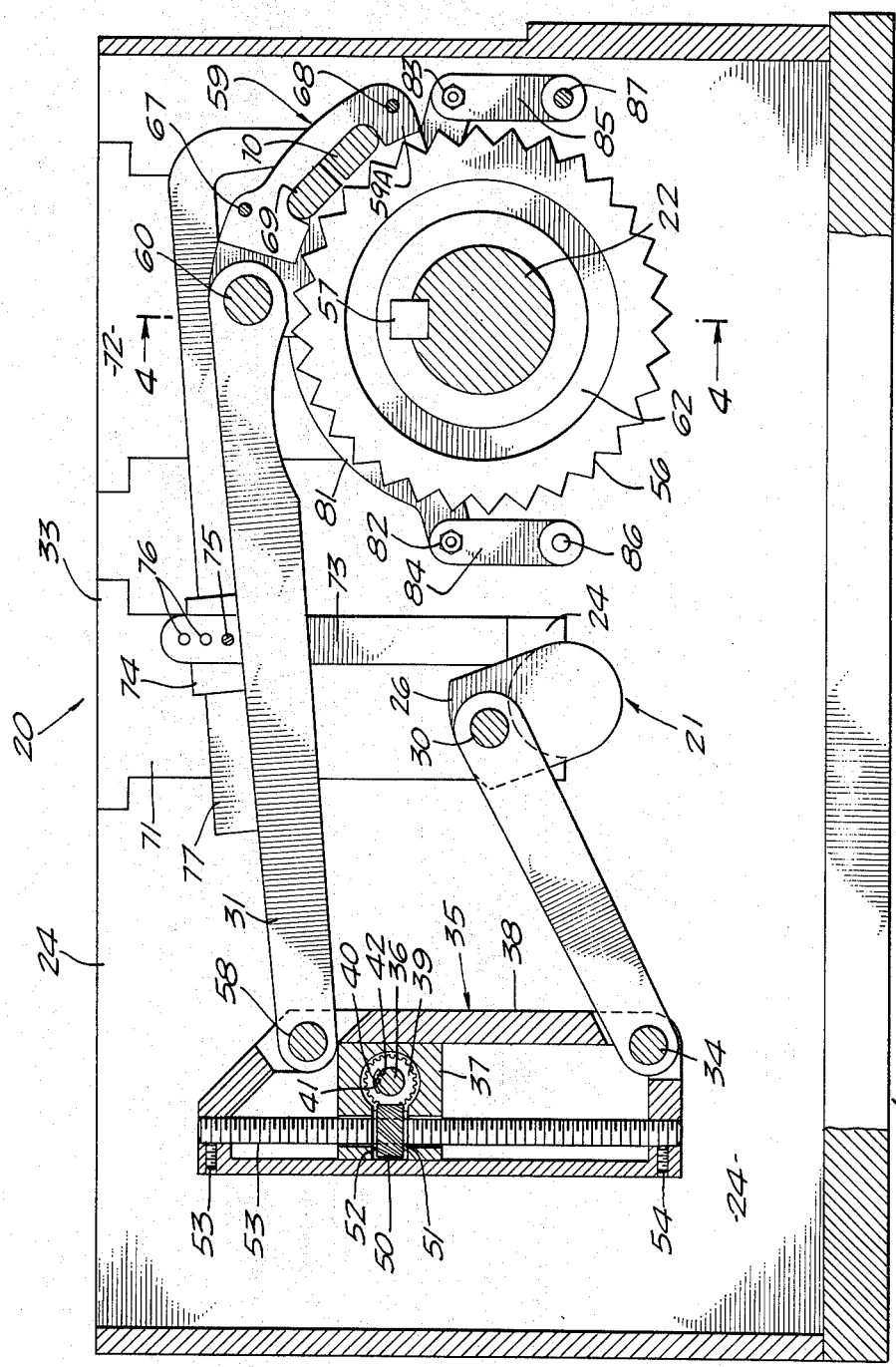
FIG. 3 is a sectional view taken on the line 3—3 of the transmission shown in FIG. 1.

In the drawings in FIG. 1, a variable speed transmission made in accordance with the present invention is indicated generally at 20 having an input crankshaft 21 and an output shaft 22 which, for the relative dimensions shown in the drawings, may have an output speed from 0 to one-fourth the angular velocity of input shaft 21. As shown in FIG. 9, input shaft 21 is supported in a bearing 23 that is fixed with fixed support means 24 which may be a case or lower housing. In addition, and not shown, the structure shown in the drawings may be provided with an upper cover to completely enclose the structure of the variable speed transmission. The same may act as a crankcase. All connecting rods, connecting arms, and wrist pins, to be described hereinafter, may also be pressure lubricated in a conventional manner although provision therefor is not disclosed herein. In addition, a conventional surplus oil spray may be provided for the equipment to aid not only in lubrication, but in vibration damping.

The crankshaft 21, as shown in FIG. 2, may be driven by a prime mover or any suitable source of mechanical power. Crankshaft 21 is provided with intermediate shaft sections 25 which, in general, hold together crank arms 26. Crank arms 26 in turn are held together by four wrist pins 27, 28, 29, and 30. A connecting rod is pivotally supported at the position of each of the wrist pins.

As mentioned hereinbefore, the device of the present invention involves the use of a pawl driven ratchet wheel. In the preferred practice of the present invention, four pawl driven ratchet wheels are employed. All four of these mechanisms may be identical. The device shown in FIG. 1, is, in fact, a transmission incorporating four such mechanisms. Each of the four mechanisms is timed to operate over a one-fourth revolution of crankshaft 21. Hence, none of these mechanisms are in exactly the same position and moving in the same direction at the same time. Notwithstanding that these positions change with time, each one of the mechanisms is in fact identical in structure to each of the others. For this reason, the construction of only one of the mechanisms will be described in detail hereinafter. In particular, the mechanism including a connecting arm 31 shown in FIGS. 1 and 3 will be the only one described in detail hereinafter. For this reason, this mechanism includes only one of the aforementioned connecting rods, which connecting rod is indicated at 32 in FIG. 3 connected to wrist pin 30.

As shown in FIGS. 3 and 9, a portion 33 of case 24 holds bearing 23 in position around crankshaft 21. Connecting arm 32 is connected from wrist pin 30 and also pivoted from a pin 34 fixed with a linkage 35 that is movable in a direction perpendicular to the axis of a linkage shaft 36 fixed relative to case 24. Linkage 35 is provided with a block 37 therein on which an exterior shell 38 thereof may be slidably moved. Block 37 prevents axial movement of a 45 degree helical gear 39 rotatable on linkage shaft 36. A key 40 is fixed in keyway 41 in linkage shaft 36. A keyway 42 is provided in helical gear 39 which is substantially larger than the width of key 40. Keyway 36 is oversize for a reason which will be apparent hereinafter. Summarized briefly, this reason is that each linkage 35 in each of the mechanisms shown in FIG. 1 are adjusted in position on linkage shaft 36 simultaneously. However, their timed relation between the operation of each means that one linkage 35 can be moving in one direction toward its extreme limit of travel while another can be moving in the opposite direction toward its extreme limit of travel. Oversized keyway 42 thus prevents key 40 from becoming damaged or maintained under compression when linkages 35 in any of the mechanisms are at their extreme limits of travel. The fact that keyway 42, however, has some finite angular length, means that all of the linkages 35 of each of the mechanisms shown in FIG. 1 may be adjusted simultaneously while key 40 will not be damaged or be maintained in compression when any two of the linkages 35 are positioned in their opposite extreme limits of travel.

Linkage shaft 36 is rotatable in a pair of bearings 43 and 44 located in case 24. Note will be taken that the upper end of linkage shaft 36, as shown in FIG. 1, is threaded and plates 45 and 46 fixed to opposite sides of case 24 are provided to support linkage shaft 36.

Linkage shaft 36 is preferably turned by a motor 47 fixed to case 24 by a bracket 48 which in turn drives linkage shaft 36 through a worm and worm gear connection, not shown, in a gear box 39 as shown in FIG. 1. As stated previously, linkage 35 will be raised on linkage shaft 36 by turning linkage shaft 36. Turning linkage shaft 36 causes key 40 to engage the end of keyway 42 and to rotate helical gear 39. Helical gear 39 in turn meshes with a second helical gear 50 which is permitted to rotate about its own symmetrical vertical axis, as shown in FIG. 3, but which is maintained in a fixed axial position relative to block 37 between thrust bearings 51 and 52 shown in FIG. 3. Second helical gear 50 is provided with a helical thread internally thereof to cause linkage 35 to move by rotation thereof to raise or to lower a lead screw 53 fixed with linkage 35 by set screws 54 and 55. The variable speed adjustment of the present invention is provided by adjusting the position of linkage 35 on linkage shaft 36. This, in turn, adjusts the lever arm, so to speak, between the center of shaft 34 and the center of linkage shaft 36 through which an output ratchet wheel 56, shown in FIG. 3, is driven, which ratchet wheel 56 is fixed to output shaft 22 by means of a key 57. Effectively, the upper end of linkage 35 is moved so close to the axis of linkage shaft 36 that no substantial movement of connecting arm 31 is made to rotate ratchet wheel 56 to any degree whatsoever. The angular width of the teeth of ratchet wheel 56 may, of course, be appropriately designed for this purpose. Still further, this condition of zero output velocity may be practically achieved several ways in accordance with the present invention.

Connecting arm 31 is pivoted to the upper end of linkage 35 at a pin 58 fixed to linkage 35. Connecting arm 31, in turn, is pivoted from pawl support means indicated generally at 59 by means of a pin 60 fixed relative to support means 59. Pawl support means 59 is rotatable about the axis of output shaft 22 because it encircles the outer end of a portion of ratchet wheel 56 as shown in FIG. 4, ratchet wheel 56 being provided with circular slots 61 and 62 therein into which guide shoes 63 and 64 are positioned, shoes 63 and 64 being fixed relative to pawl support means 59 by means of screws 65 and 66.

As shown in FIG. 1, linkage 35 may be made of one integral part, if desired. Pawl support means may be made of two parts indicated at 59A and 59B, as shown in FIG. 1. These parts may be held together by bolts indicated at 67 and 68 shown in FIG. 3. Pawl support means 59 supports pawls indicated at 69 and 70 which are rotatable about shaft extensions at each end thereof, indicated at E1 and E2 in FIG. 7 in all the pawls employed in all the mechanisms shown in FIG. 1. All the pawls including pawls 69 and 70 may have a construction of that as illustrated at P in FIG. 7. Extensions E1 of pawls 69 and 70 are shown in both FIGS. 6 and 8.

Linkage 35 is shown in a "neutral" position on linkage shaft 36 shown in FIG. 3. In this position, even if one of the pawls 69 or 70 is engaged with ratchet wheel 56, ratchet wheel 56 will not turn to any substantial extent.

As shown in FIG. 3, sections 71 and 72 of case 24 are provided to hold crankshaft 21 and output shaft 22 in position therein. A portion of section 71 is to provide means by which a support 73 may be fixed in position relative to case 24 to hold drag means 74 in a position pivotally about a bolt 75 through one of a plurality of holes 76 therethrough. Drag means 74 may be simply a spring biased clamp to clamp on each side of a pawl actuator member 77 which is pivoted about an eccentric extension E3 on pawl P shown in FIG. 7. Extension E3 is hollow and internally threaded at E4, whereby a bolt may be threaded into extension E3 to pivot actuator member 77 therefrom. Actuator member 77 actually rotates pawl 70 about the symmetrical axis of its extensions E1 and E2. An actuator member is provided for each of the pawls 69 and 70. The other actuator member for pawl 69 is shown at 78 in FIG. 6. A bolt to pivot actuator member 77 on pawl 70 is indicated at 79 in FIG. 1. A similar bolt 80 for pivoting actuator member 78 to pawl 69 is also shown in FIG. 1.

Pawls 69 and 70 are employed to drive a ratchet wheel, alternatively, in either one of two opposite directions. Pawls 69 and 70 are therefore never operated simultaneously. A plurality of cams are employed to render one of the pawls 69 or 70 in each of the mechanisms shown in FIG. 1 inoperative. In the position shown in FIG. 3, both pawls 69 and 70 have been rendered inoperative. This is done by rotating all of the cams, one of which is indicated at 81 in FIG. 3, to the position of cam 81 shown in FIG. 3. Cam 81 is an arcuate piece of metal concentric with the output shaft 22 when it is located in the position shown in FIG. 3. Cam 81 is pivoted at bolts 82 and 83 to linkages 84 and 85 which are maintained about shafts 86 and 87. Both shafts 86 and 87 are shown in FIG. 1. Linkage 85 and all the corresponding linkages of the mechanisms shown in FIG. 1 are keyed to shaft 87 but are rotatable about shaft 86. As will be explained hereinafter, movement of cam 81 to one of two appropriate positions will render pawl 69 inoperative. When the same is moved to the other of the two positions, pawl 69 is rendered operative.

As shown in FIG. 1, drag means 88 are provided to resist yieldingly longitudinal movement of pawl actuator member 78 therethrough.

The motion of each of the mechanisms shown in FIG. 1 is illustrated by the motion of the moving parts, including linkage 35 as shown in FIG. 5. Linkage 35 moves from the position shown in solid lines in FIG. 5 to a position shown in dotted lines 35'. When linkage 35 so moves, connecting rod 32 and connecting arm 31 move from the positions shown in solid lines to the position shown in dotted lines 31" and 32' respectively. Similarly, wrist pin 30 moves from the position shown in the solid lines to the position shown in dotted lines 30'. Note will be taken that when one of the pawls 69 is rendered operative and the other is not, ratchet wheel 56 is always driven in the same direction regardless of the direction of rotation of crankshaft 21. In the position shown in FIG. 5, pawl 69 is disengaged and pawl 70 is engaged. Pawl 69 is always disengaged when pawl 70 is engaged. Note will be taken that ratchet wheel 56 is driven in a counterclockwise direction with pawl 70 in the position shown in FIG. 5.

Thus far herein, a reference has been to the use of a plurality of mechanisms other than the mechanism employing linkage 35 shown in FIG. 5. The timed relation mentioned previously between mechanisms is, in effect, a result of the 90 degree angularly offset positions of wrist pins 27, 28, 29 and 30 of crankshaft 21 shown in FIG. 2. Each of the mechanisms drive corresponding ratchet wheels in succession. The ratchet wheel of a mechanism immediately succeeding the ratchet wheel of a mechanism in which pawl 70 engages the ratchet wheel angularly, is positioned exactly one-half tooth about output shaft 22 from the ratchet wheel in which pawl 70 is engaged. This arrangement is selected so that a pawl 70 about to engage a ratchet wheel 56 lies above a tooth and eventually engages the same without damaging it.

Figure 6:
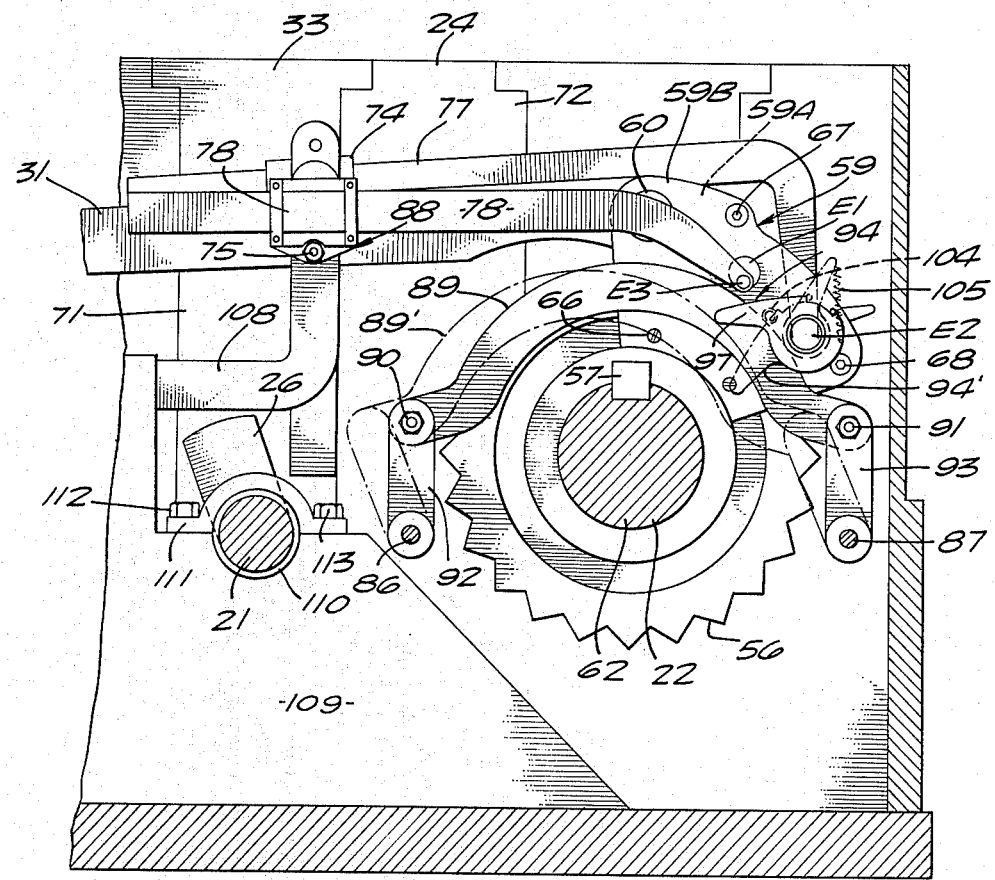
FIG. 6 is a sectional view taken on the line 6—6 of the transmission shown in FIG. 1.
Figure 8:
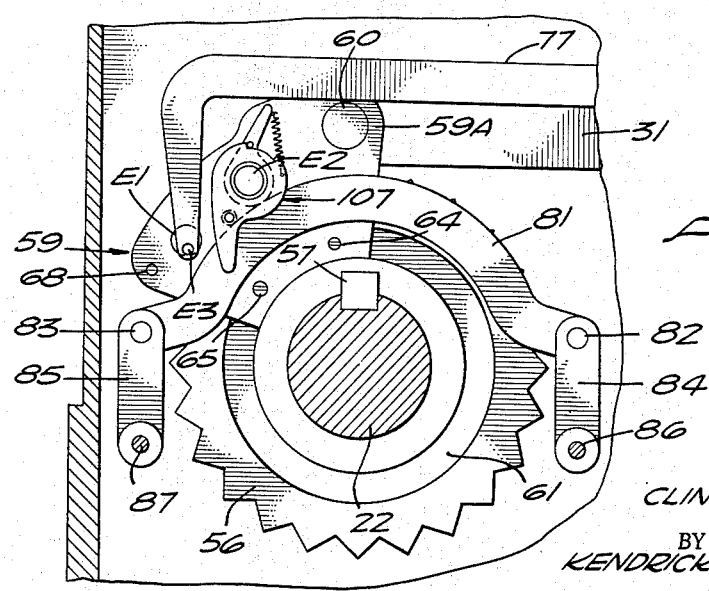
FIG. 8 is a sectional view of the transmission similar to that shown in FIG. 6, but taken on the opposite side thereof.

A cam 89, as shown in FIG. 6, similar to cam 81 shown in FIGS. 3 and 5, is provided to render pawl 70 operative and inoperative selectively. When cam 89 is in the solid line position shown in FIG. 6, pawl 70 is rendered inoperative. When it is in the dotted line position indicated at 80', pawl 70 is rendered operative. Cam 89 is rotatably mounted on bolts 90 and 91 connecting the same to linkages 92 and 93 respectively, disposed about shafts 86 and 87 respectively. Linkage 93 is rotatable about shaft 87 and linkage 92 is keyed to shaft 86. The manner in which pawl 70 is operated can perhaps best be understood by a description of the structure of a pawl operator 94, shown in both FIGS. 6 and 7. Pawl operator 94 includes an arm 95 about which a pair of fingers 96 and 97 are rotatable. Fingers 96 and 97 are connected together by a pin 98 and a pin 99 fixed relative thereto. Arm 95 is provided with a cylindrical end having a bore 100 therein into which extension E2 of pawl 70 is press fit. The cylindrical portion of arm 95 is provided with shoulders 101 about which fingers 96 and 97 are rotatable. Fingers 96 and 97 are each provided with notches at 102, the ends of which may be engaged by a projection 103 fixed to arm 95. Fingers 96 and 97 straddle cam 89. A cylindrical follower 104 rotatable about shaft 89 causes follower 104 to roll on the top cylindrical surface of cam 89 when it is in the position shown in solid lines in FIG. 6. In this position, as stated previously, cam 70 is disengaged. A spring 105, as shown in FIG. 7, connects an end 106 of arm 95 to pin 98. The cam operator 94 is provided with, among other structures, spring 105 to prevent cam 89 from disengaging pawl 70 when torque is applied to ratchet wheel 56 in a clockwise direction as viewed in FIG. 6 and pawl 70 is still in engagement therewith. When operator 94 shown in FIG. 6 moves from the dotted line position indicated at 94' to the solid line position 94 and pawl 70 is held in the position shown in FIG. 5 by the said clockwise torque on ratchet wheel 56, pawl 70 does not move although fingers 96 and 97 are moved to the solid line position shown in FIG. 6 by raising cam 89 from the dotted line position 89' to the solid line position shown in FIG. 6. When the said clockwise torque is released from ratchet wheel 56, spring 105 comes into play and draws pawl 70 from the position shown in FIG. 5 to the position shown in FIG. 3 through arm 95. A similar pawl actuator 107 is provided for pawl 69 as shown in FIG. 8.

The manner in which pawl actuator members 77 and 78 operate is that drag means 74 and 88 thereon respectively resist movement of actuator members 77 and 78 yieldingly and thus rotate pawls 70 and 69 respectively, due to the eccentric connection of actuator members 77 and 78 on pawls 70 and 69, at an extension E3 on each.

As shown in FIG. 6, in order not to interfere with crankshaft 21, some of the supports for drag means similar to drag means 88 may be provided as indicated at 108 fixed to a partition 109 in case 24, crankshaft 21 being held in a bearing 110 supported in a bracket 111 on partition 109 by bolts 112 and 113. Similarly, linkage shaft 36 is supported in these same partitions by brackets 114 on partitions 109 held thereto by bolts 105 as shown in FIG. 1.

The manner in which pawl operators 94 and 107 are moved by cams 81 and 89 respectively, and other corresponding cams in the four mechanisms shown in FIG. 1, is best illustrated in FIGS. 1, 9, and 10. Shaft 86, as shown in FIG. 9, is rotated through a linkage 116 fixed thereto. Linkage 116 in turn is pivoted to another linkage 117 at 118, the linkage 117 being pivoted to a linkage 119 at a pin 120. Linkage 119 is pivoted from case 24 at a pin 121, linkage 119 being provided with a manually operative handle 122 with a spring biased pin therein to fit in one of two holes 123 and 124 in case 24. Shaft 87 is rotated by an identical linkage arrangement. It is impossible to rotate shafts 86 and 87 to the right from the positions thereof shown in FIG. 9, simultaneously. A locking mechanism is provided for this purpose indicated generally at 125 in FIG. 1, including discs 126 and 127 fixed relative to shafts 86 and 87, respectively. Discs 126 and 127 are also both illustrated in FIG. 10 having slots 128 and 129 therein into which opposite ends of a rod 130 are slidable. In the position shown in FIG. 10, shaft 86 cannot move because the right end of shaft 130 is positioned in slot 128. Shaft 130 is slidable in brackets 131 and 132 fixed to case 24, as shown in FIG. 1. The edges of slots 128 and 129 are rounded in such a manner that rotation of shaft 86 will drive rod 130 out of slot 128 into slot 129 provided slot 129 is aligned with rod 130. Conversely, when rod 130 is in slot 129, rotation of shaft 86 will drive rod 130 out of slot 129 into slot 128 provided the latter is in alignment with rod 130. Both of the foregoing functions, as stated previously, are provided by rounding or "camming" surfaces of slots 128 and 129. The same may be true of the ends of rod 130.

In addition to the foregoing, it is not possible to move rod 130 to the left or to the right when linkage 36 is in a position other than that shown in FIG. 3. This is prevented by the use of notches 133 and 134 in shaft 130, shown in FIG. 1, into which a projection 135 extends whenever linkage 36 is not in "neutral." Projection 135 is fixed to a linkage 136 that is pivoted from case 24 at a pin 137. A connecting rod 138 is pivoted at 139 from linkage 136 and at 140 to another linkage 141. Linkage 141 is pivoted at 142 to case 24. Linkage 141 is moved by a projection 143 which is fixed to and extends upwardly from a ring 144 that is threaded onto shaft 36 at its upper end as viewed in FIG. 1. Projection 143 extends upwardly through a slot 145 in linkage 141. As shown in FIG. 10, ring 144 is provided with an extension at 146 having a hole 147 therethrough through which a pin 148 projects, pin 148 being fixed to case 24.

Figure 11:
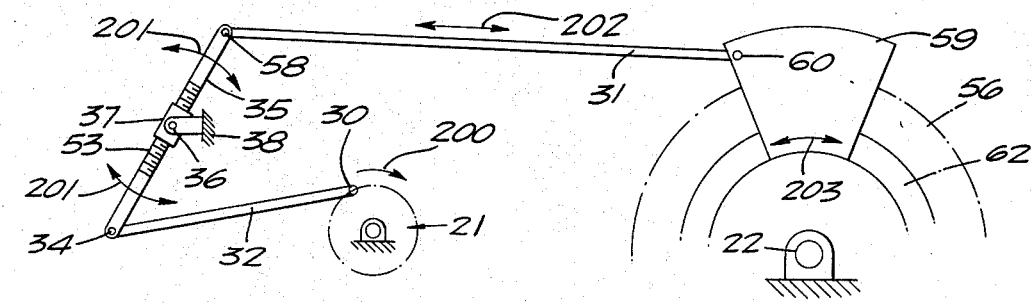
FIG. 11 is a schematic diagram of the operation of the system of the invention shown in FIGS. 1 to 10, inclusive.
Figure 12:
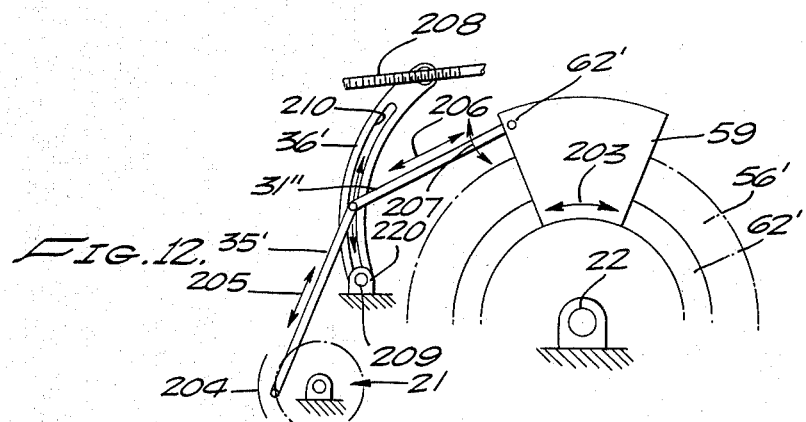
FIG. 12 is a schematic diagram of transmission illustrated in FIGS. 13 to 17 inclusive.

One of the driving mechanisms of the transmission illustrated in FIGS. 1 to 10, inclusive, is shown schematically in FIG. 11. An alternative embodiment of the invention is shown in FIGS. 13 to 17 inclusive. A diagrammatic view of the mechanism in the alternative embodiment of the invention is shown in FIG. 12 for comparison with that shown in FIG. 11. Wrist pin 30 is shown in FIG. 11 adapted to be driven in the direction of an arrow 200 by crankshaft 21. The reciprocation of connecting rod 32 pivoted to linkage 35 at pin 34 oscillates linkage 35 about linkage shaft 36 in the direction of arrows 201. A thread is shown on linkage 35 in FIG. 11 to indicate that the position of linkage shaft 36 along the length of the linkage is adjustable. As before, connecting arm 31 is pivoted at 58 to linkage 35 and at 60 to pawl support means 59. When drive shaft 21 is driven, connecting arm 31 thus reciprocates in the direction of arrows 202. In this case, pawl support means oscillates in the direction of arrows 203 and output shaft 22 is rotated continuously in one direction depending upon which of the pawls in pawl support means 59 is rendered operative.

In FIGS. 13 to 17 inclusive, a driving mechanism similar to that illustrated schematically in FIG. 12 is employed. The same crankshaft 21 may be employed. Crankshaft 21 may be rotated in either direction, for example in the direction indicated by arrow 204. In this case, a linkage 35' which may correspond to linkage 35 is reciprocated in a direction indicated by arrows 205. A linkage shaft means 36' corresponding to linkage shaft 36 guides movement of the upper end of linkage 35' as shown in FIG. 12. At this same point, movement of a connecting arm 31' is likewise guided. Connecting arm 31' reciprocates in the direction of arrows 206 and also rotates about a pin 62' identical to pin 60 on support means 59 in the direction of arrows 207. Support means 59 may be identical in both of the embodiments shown in FIGS. 11 and 12. The same is true of output shaft 22. As before, pawl support means 59 is oscillated in the direction of arrows 203 and output shaft 22 is driven in one particular desired direction. A threaded rod 208 is provided to adjust the position of upper end of linkage shaft means 36' the lower end of which is pivoted in a fixed position relative to case 20 or about a pin 209. Linkage shaft means 36' is provided with a curved slot 210 therein to guide movement of the upper end of linkage 35' and the lower end of connecting arm 31' as shown in FIG. 12. The curvature of the slot 210 is on the arc of a circle having a radius which is equal to the distance between the pivot positions of connecting arm 31' to linkage 35' where it is guided by linkage shaft means 36' and at pin 62' on pawl support means 59.

In accordance with the present invention, in the alternative embodiment of the invention shown in FIGS. 13 to 17, inclusive, all the component parts of the embodiment of the invention shown in FIGS. 1 to 11 may be employed with the exception of a few component parts which are illustrated in FIGS. 12 to 17, inclusive.

Figure 13:
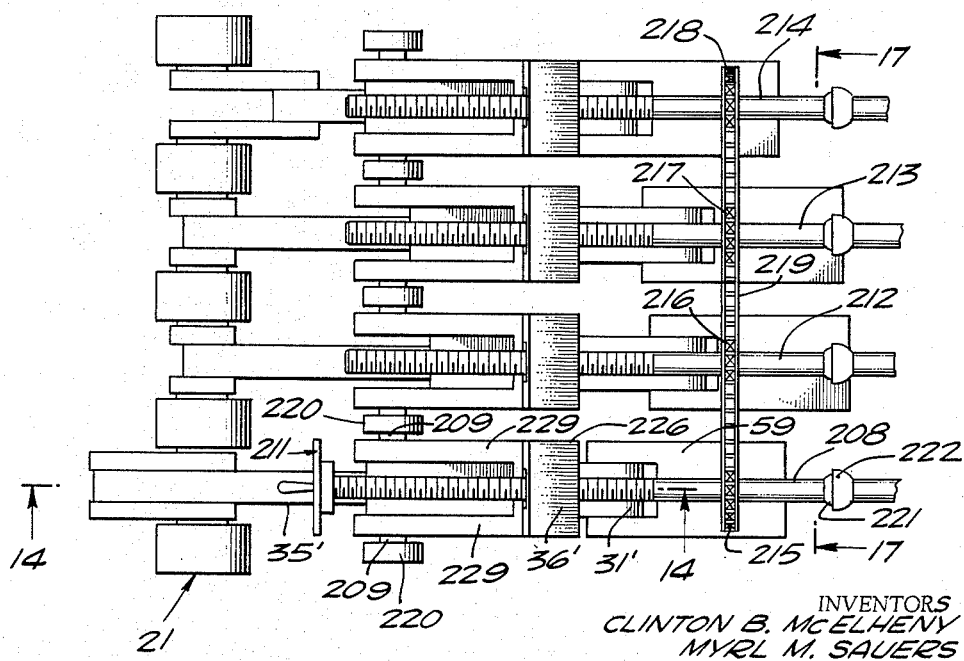
FIG. 13 is a top plan view of an alternative embodiment of the present invention.

In FIG. 13, a top plan view of the different structures are shown. As in the case of transmission 20, four mechanisms similar to that illustrated in FIG. 12 are employed in the transmission shown in FIG. 13. For this reason, one of these mechanisms shown at the bottom thereof will be described in detail, all the others being identical with the exception of a hand wheel shown at 211 and 90 degree input crankshaft connections, which angular spacing is identical to that of the mechanisms employed in the transmission 20. Each mechanism is, however, provided with a threaded rod 212, 213, and 214 similar to rod 8. As shown in FIG. 17, rods 208, 212, 213, and 214 are fixed to sprockets 215, 216, and 217 around a chain 219. Each of the rods 208, 212, 213, and 214 are threaded through corresponding linkage shaft means 36'. In order to rotate each one at the same angular rate about corresponding pin 209, the threads on rods 212 and 213 have corresponding greater pitches due to the fact that sprockets 216 and 217 are larger than sprockets 215 and 218 to maintain chain 219 tight around all of the sprockets.

Note will be taken that the input crankshaft 21 is again illustrated in FIG. 13 with linkage 35' and linkage shaft means 36'. Linkage shaft means 36' is pivoted about the case 24, not shown, on pins 209 in bearings 220 fixed to case 24. Rod 208 is provided with a ball 221 at its right end as shown in FIG. 13, which fits in a socket 222 fixed relative to case 24.

Most all the structures described hereinbefore concerning FIGS. 12 and 13 are also shown in FIG. 14. Note will be taken that rod 208, in fact, is threaded through a pin 223 that is rotatable in a transverse bore 224 of sides 225 of an upwardly extending appendage 226 of linkage shaft means 36'. Note will also be taken that a pin 227 is provided at the left end of connecting arm 31' shown in FIG. 14 to guide movement of that end of connecting arm 31', whereas another separate pin 228 is provided to connect linkage 35' with connecting arm 31.

Note will be taken from FIG. 15 that linkage shaft means 36' has a clevis shape with two sides 229 each of which is provided with a slot 210 that extends partially thereinto but does not extend completely therethrough. Pin 227 thus rides in slots 210.

As shown in FIG. 16, connecting arm 31' is provided with an extension 230 having a bore 231 therethrough through which pin 228 projects. Pin 228 likewise projects through bores 232 in ears 233 that are a part of a clevis 235 which is formed integrally at the upper end of linkage 35' shown in FIG. 14.

From the foregoing, it will be appreciated that by the use of the freely operated pawls 69, 70 of the construction illustrated at P in FIG. 7, the propensity of overriding clutches to become damaged and to become jammed is avoided. Still further, no eccentric drive is employed with linkages 35 and 35' as in the case of prior art variable speed transmissions. Hence, the device of the present invention may be more easily maintained. Speed adjustment, in accordance with the present invention, is conveniently made by rotation of linkage shaft means 36 and 36'.

Note will be taken that substantial vibration is eliminated by employing the 90 degree spaced locations of wrist pins 27, 28, 29 and 30. The half tooth spacing of the ratchet wheels 56 prevents pawl damage. It is a feature of the present invention that an even number of such mechanisms more than two can be used with such a one-half tooth spacing. In this regard, it is to be noted that all the ratchet wheels 56 shown in FIG. 1 are of course keyed or fixed to shaft 22 as ratchet wheel 56 shown in FIG. 3 is so keyed at 57.

According to an outstanding feature of the present invention, the drag means 74 and 88 provide means not only to operate pawls 69 and 70 respectively, very silently, but the same also act as vibration dampers for the pawls themselves.

The variable speed transmission 20 of the present invention is versatile, in that the direction of rotation of output shaft 22 may be reversed by placing the mechanism in neutral by suitable rotation of linkage shaft 36 to withdraw projection 135 from one of the notches 133 and 134 in rod 130, two notches 133 and 134 being provided for the respective positions of rod 130 in slot 128 or slot 129.

Note will be taken that the safety feature of the use of spring 105 of the pawl actuators 94 and 107 also prevents pawl damage by preventing a pawl from being withdrawn from a corresponding ratchet wheel 56 until the same no longer binds therein by a counter torque thereon. The use of the arrangement, including projections 135 on linkage 136, also prevents pawls 69 and 70 from jamming in ratchet wheel 56. The same is true of the arrangement 125 which makes it impossible to engage both pawl 69 and pawl 70 in the same ratchet wheel 56 at the same time.

Another outstanding feature of the present invention resides in the use of the arrangement shown in FIG. 3 wherein crankshaft 21 is positioned in between output shaft 22 and linkage shaft 36. It has been found that this arrangement especially reduces vibration of the variable speed transmission 20 of the present invention.

Note will be taken that due to the gear reduction and the manner in which pawls 69 and 70 are actuated, the variable speed transmission 20 of the present invention is a "hill holder," that is, when used in conjunction with a constant speed prime mover on an automotive vehicle, the vehicle will not reverse directions as linkage 36 is moved to the neutral position shown in FIG. 3.

Although operation of the device of the present invention as illustrated in FIG. 5 has been described in connection with driving output shaft 22 in a counterclockwise direction by the use of pawl 70, it may be driven in a clockwise direction by pawl 69 simply by rendering pawl 70 inoperative by raising cam 89 to the solid line position shown in FIG. 6 and by lowering cam 81, shown in FIG. 5, to a position identical to that of cam 89 shown in dotted lines at 89' in FIG. 6.

In accordance with the embodiment of the invention illustrated in FIGS. 12 to 17 inclusive, movably adjustable means including linkage shaft means 36' is provided to guide movement of connecting arm 31'. Connecting arm 31' at the position of pin 227 shown in FIG. 14, thus may move along the arc of a circle which slots 210 in linkage shaft means 36' follow. Connecting arm 31' from the center of pin 62' to the center of pin 227 may then be equal to the radius of the said circle of which the slots 210 form an arc. By rotating linkage shaft means 36' about pin 209, it is then possible to move the center of the arc of slots 210 to a position on a circle whose center is the center of output shaft 22 and whose radius is the distance therefrom to the center of pin 62'. In this event, it is thus possible to provide a perfect neutral for the output means, in such case connecting arm 31' will rotate only in the direction of arrows 207, shown in FIG. 2, about the center of pin 62' and the pawl support means 59 will not oscillate in the direction of arrows 203 to any extent whatsoever. Note will be taken that due to interference, such a perfect neutral is not possible with the mechanism shown in FIG. 11 because it is not possible to locate the center of pin 58 exactly at the center of linkage shaft means 36 because of course two pins cannot occupy the same place at the same time. This is not a limitation which would cause the mechanism, shown in FIG. 11, to be inoperative, however, it is to be noted that in such a case, the angular and/or the linear displacement of teeth on any ratchet wheel fixed to output shaft 22 must be sufficiently large in order that output shaft 22 will not be rotated when the position of pin 58 is placed as close as possible to the linkage shaft 36 shown in FIG. 11.

Since many changes and modifications of the present invention may be made, and certain embodiments have been shown and described herein for the purpose of illustration only, the invention should not be limited to the specific embodiments disclosed, the true scope of the invention being defined only in the appended claims.

What we claim is:

1. A variable speed transmission comprising: an input crankshaft; a connecting rod pivoted from said crankshaft at a position thereon spaced from the axis of rotation thereof; a linkage pivoted from said connecting rod at first position along the length of said linkage; a linkage shaft supported in a fixed transverse position relative to the axis of rotation of said crankshaft; said linkage being pivotally mounted about said linkage shaft at a second position along the length of said linkage spaced from said first position, said linkage having a longitudinal slot therein to fit over said linkage shaft; an output shaft; output means responsive to oscillation of said linkage by rotation of said crankshaft for continually applying torque to rotate said output shaft a predetermined amount once during each period of said oscillation; speed control means to adjust the pivot position of said linkage on said linkage shaft, the output means travel of said predetermined amount being variable with adjustment of said linkage pivot position, said speed control means including a first helical gear fixed to said linkage shaft; a second helical gear; means to hold said second helical gear in a substantially fixed axial position relative to said linkage shaft and to hold said second helical gear in a position rotatable about its own axis of symmetry in mesh with said first helical gear; and a lead screw connected to said linkage in fixed axial and rotational positions, said second helical gear having a female internal thread and being threaded around said lead screw.

2. A variable speed transmission comprising: an input crankshaft; a plurality of connecting rods pivoted from said crankshaft at a plurality of different corresponding positions thereon spaced from the axis of rotation thereof, said connecting rod pivot positions being uniformly spaced around the crankshaft axis of rotation; a linkage pivoted from each of said connecting rods at a first position along the lengths thereof; a linkage shaft supported in a fixed transverse position relative to the axis of rotation of said crankshaft, each of said linkages being pivotally mounted about said linkage shaft at a second position along the lengths thereof spaced from said first position therealong; each of said linkages having a longitudinal slot therein to fit over said linkage shaft; an output shaft; output means responsive to oscillation of said linkages by rotation of said crankshaft for continually applying torque to rotate said output shaft a predetermined amount once during each period of the oscillation of each of said linkages; speed control means to adjust the pivot position of each of said linkages on said linkage shaft, the output means travel of said predetermined amount being variable with adjustment of said linkage pivot position, said speed control means including a first helical gear for each of said linkages, each of said first helical gears having a keyway therein; a second helical gear for each of said first helical gears; means for holding each of said second helical gears in a substantially fixed axial position relative to said linkage shaft rotatable about the corresponding axis of symmetry of each in mesh with each corresponding first helical gear; and a lead screw connected to each of said linkages in fixed axial and rotational positions thereon, each of said second helical gears having a female internal thread and being threaded around each corresponding lead screw, said linkage shaft having longitudinal key means fixed at the same angular position therearound to enter each corresponding keyway in each of said first helical gears, each of said keyways being of an angular width larger than that of said key means and of an angular width sufficiently large to permit said linkages to move to their extreme limits of travel relative to each other without supplying a compressive force to said key means.

3. A reciprocatory-to-rotary transmission comprising: a ratchet wheel; pawl support means adapted to oscillate in a position adjacent said ratchet wheel; a pair of pawls mounted to move on said pawl support means from actuated positions alternately engageable with said ratchet wheel to deactuated positions alternately spaced therefrom and vice versa; an actuating member for moving each of said pawls; drag means to resist yieldingly movement of said pawl actuating members in a manner tending to move one of said pawls from said actuated position to said deactuated position while moving the other of said pawls from said deactuated position to said actuated position, and for alternatively moving said one pawl from said deactuated position to said actuated position thereof and while moving said other pawl from said actuated position to said deactuated position thereof; an operator for each pawl, yielding means connected between each corresponding pawl operator and each corresponding pawl; a cam for each of said pawls to move each corresponding operator; shift means to raise one of said cams to render one of said pawls inoperative and to lower one of said cams to render the other of said pawls operative contemporaneously therewith, said yielding means permitting said shift means to operate without forcibly removing one of said pawls from said ratchet wheel prior to the time that motion of said ratchet wheel is reversed.

4. A reciprocatory-to-rotary transmission comprising: fixed support means; a ratchet wheel rotatable about a predetermined axis on said support means; pawl support means pivoted about said predetermined axis; means to oscillate said pawl support means about said predetermined axis; two pawls pivoted to said pawl support means to move alternately from an actuated position in engagement with said ratchet wheel to a deactuated position and vice versa; an actuating member for each of said pawls pivoted relative to each corresponding pawl at a position spaced from the position on each corresponding pawl at which each corresponding pawl is pivoted to said pawl support means; drag means fixed to said support means to hold said pawl actuating members and to resist movement of said pawl actuating members by friction in a manner tending to move one pawl from said actuated position to said deactuated position while the other pawl is moved from said deactuated position to said actuated position, and in a manner tending to move said other pawl from said actuated position to said deactuated position while said one pawl is moved from said deactuated position to said actuated position during corresponding half-periods of said pawl support means oscillations; a cam for each of said pawls mounted on said fixed support means movable to a position to limit movement of each of said pawls induced by said drag means and each corresponding actuating member thereof; an operator for each pawl; spring means between each corresponding operator and each corresponding pawl; and shift means to raise one of said cams to render one of said pawls inoperative and to lower one of said cams to render the other of said pawls operative contemporaneously and vice versa, said spring means thereby preventing removal of a pawl from engagement with said ratchet wheel when torque is applied to said ratchet wheel in a direction to hold said pawl in engagement therewith during actuation of said shift means.

5. A variable speed transmission comprising: fixed support means; a crankshaft rotatable on said fixed support means; a linkage connected with said crankshaft in a manner to be reciprocated once for each revolution of said crankshaft; support means guided for oscillatory movement over a predetermined distance along a predetermined path of travel in the shape of a first arc of a first circle; a connecting arm having one end pivoted from said linkage and having the other end thereof pivoted from said movable support means at a first predetermined position; movably adjustable means for guiding movement of said connecting arm along a second arc of a second circle at a second predetermined position thereon spaced from said other end thereof, said adjustable means including a member rotatable about one end thereof and means for holding said member in a plurality of selected positions rotated about said one end thereof, said member being a clevis having a slot therein in the shape of said second arc, said connecting arm having a pin therethrough at said second predetermined position slidable in said slot, the distance between said predetermined positions being equal to the radius of said second arc, said adjustable means being movable to a position such that the center of said second arc lies on said first arc; an output shaft; and means connected with said movable support means for continually applying torque to rotate said output shaft in a direction said movable support means travels during a one-half period of oscillation thereof in a single predetermined direction.

References Cited by the Examiner
UNITED STATES PATENTS

| | | | |
|---|---|---|---|
| 554,890 | 2/1896 | Meier | 74—158 X |
| 1,163,815 | 12/1915 | Evensen | 74—151 X |
| 1,181,167 | 5/1916 | Reece | 74—119 |
| 1,520,922 | 12/1924 | Baker | 74—150 X |
| 1,781,805 | 11/1930 | Camp | 74—142 |
| 1,911,156 | 5/1933 | Laing | 74—119 |
| 1,968,030 | 7/1934 | Filippis | 74—119 |
| 2,377,733 | 6/1945 | Waller | 74—142 |
| 2,538,619 | 1/1951 | Friedman | 74—119 |
| 2,618,981 | 11/1952 | Przybylski | 74—119 |
| 2,692,510 | 10/1954 | Gille | 74—119 |

BROUGHTON G. DURHAM, *Primary Examiner.*

DON A. WAITE, *Examiner.*